Jan. 31, 1939.　　　F. F. RUAU　　　2,145,528
MANUFACTURE OF FILTER PLUGS OR WADS FOR CIGARETTES
Filed Aug. 24, 1936　　　12 Sheets-Sheet 1

Inventors
F. F. Ruau
By Watson, Coit, Morse & Grindle
ATTYS.

Jan. 31, 1939. F. F. RUAU 2,145,528
MANUFACTURE OF FILTER PLUGS OR WADS FOR CIGARETTES
Filed Aug. 24, 1936   12 Sheets-Sheet 2

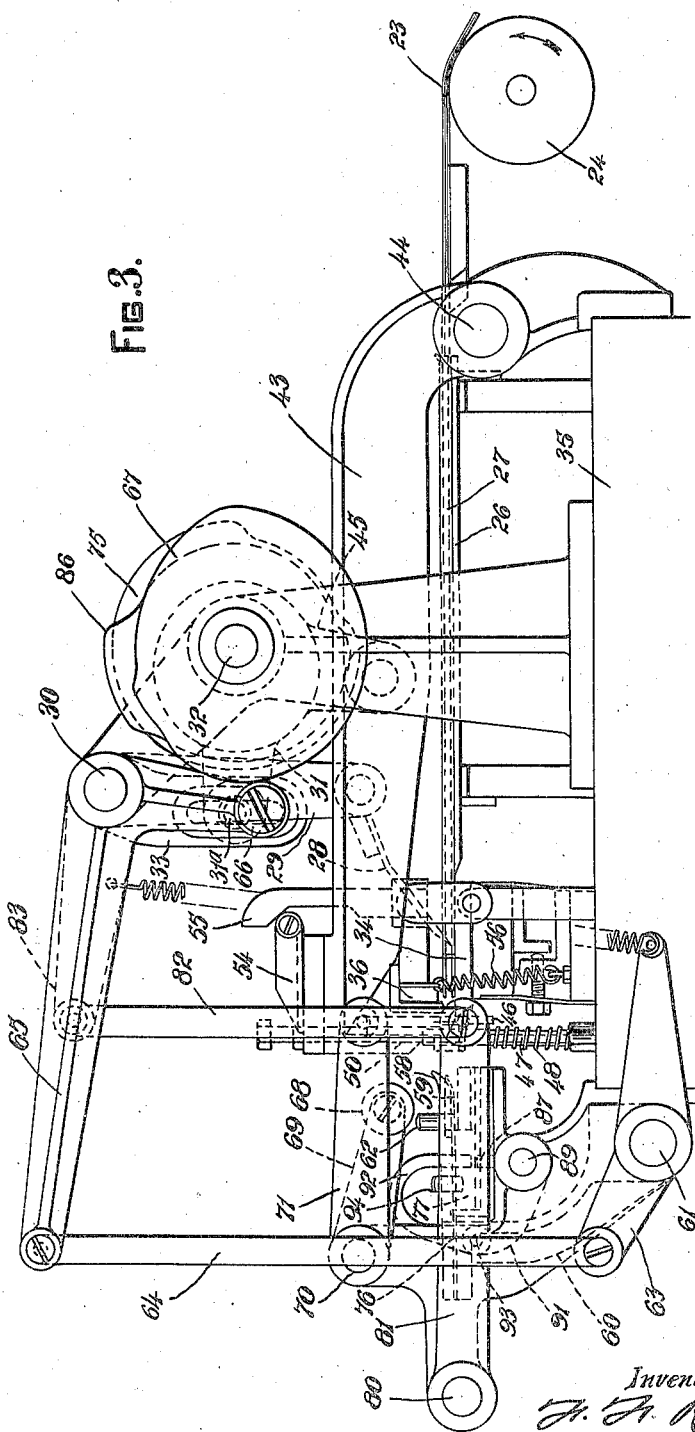

Jan. 31, 1939. F. F. RUAU 2,145,528
MANUFACTURE OF FILTER PLUGS OR WADS FOR CIGARETTES
Filed Aug. 24, 1936     12 Sheets-Sheet 5

INVENTORS

Jan. 31, 1939.  F. F. RUAU  2,145,528
MANUFACTURE OF FILTER PLUGS OR WADS FOR CIGARETTES
Filed Aug. 24, 1936  12 Sheets-Sheet 6

INVENTORS
F. F. Ruau
By Watson, Cole, Morse & Grindle
ATTYS.

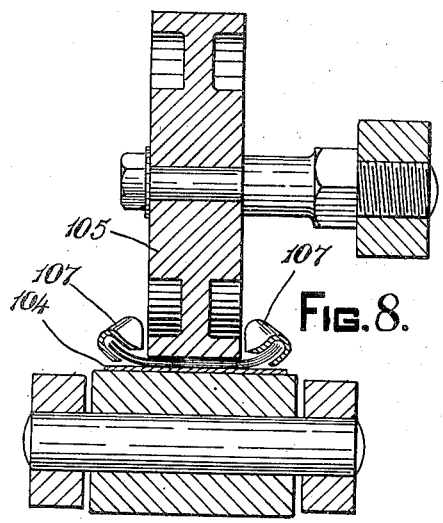
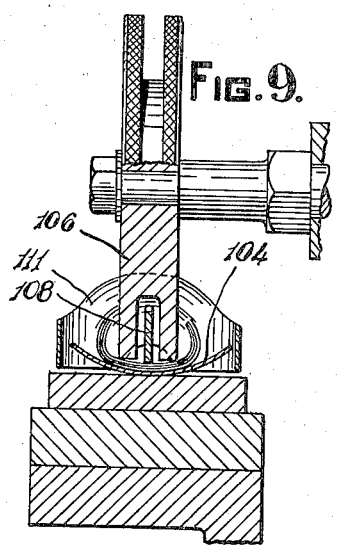
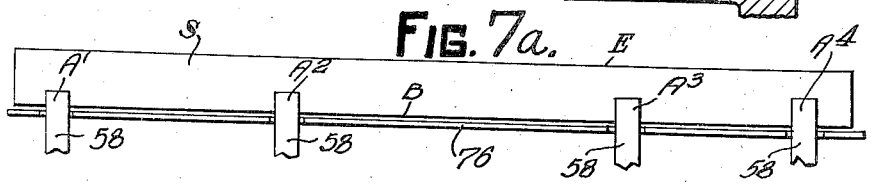

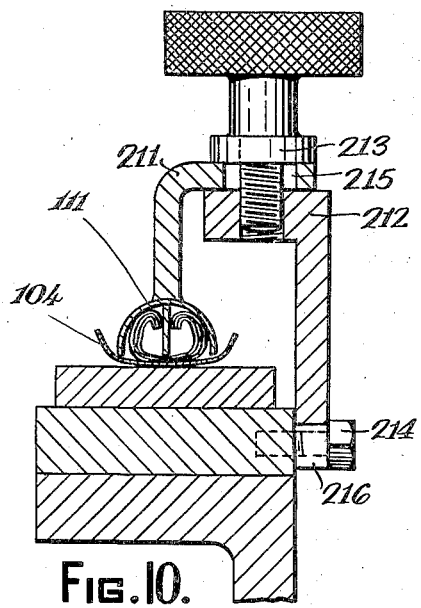
FIG.10.
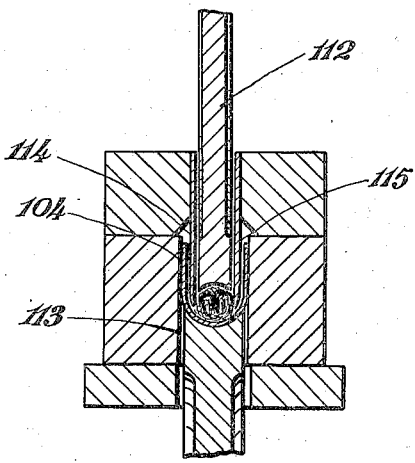
FIG.11.
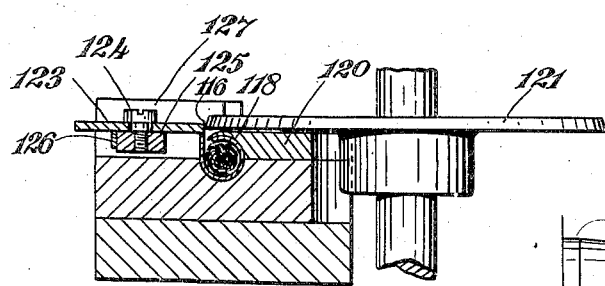
FIG.13.
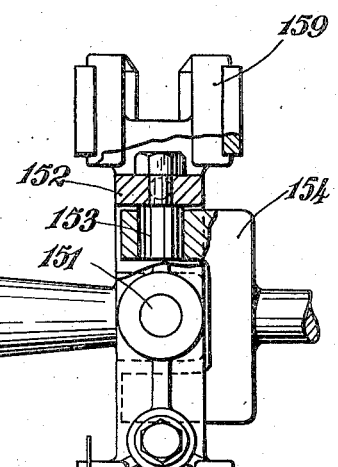
FIG.18.
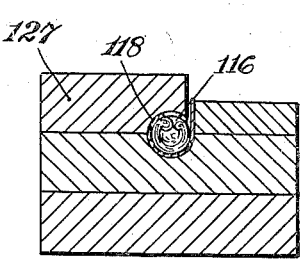
FIG.14.
FIG.12.

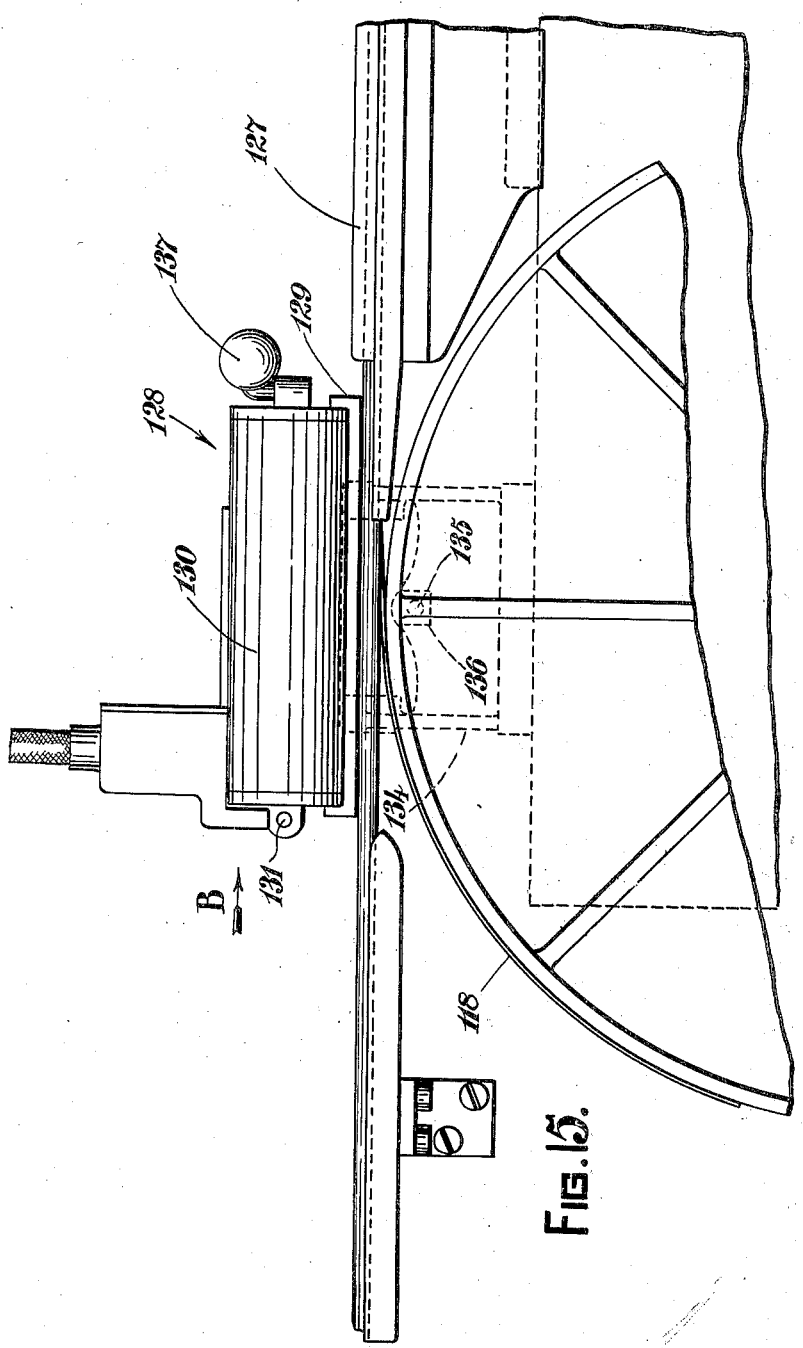

Jan. 31, 1939.  F. F. RUAU  2,145,528
MANUFACTURE OF FILTER PLUGS OR WADS FOR CIGARETTES
Filed Aug. 24, 1936   12 Sheets-Sheet 10

INVENTORS
F. F. Ruau,
By Watson, Coit, Moore & Grindle
ATTYS.

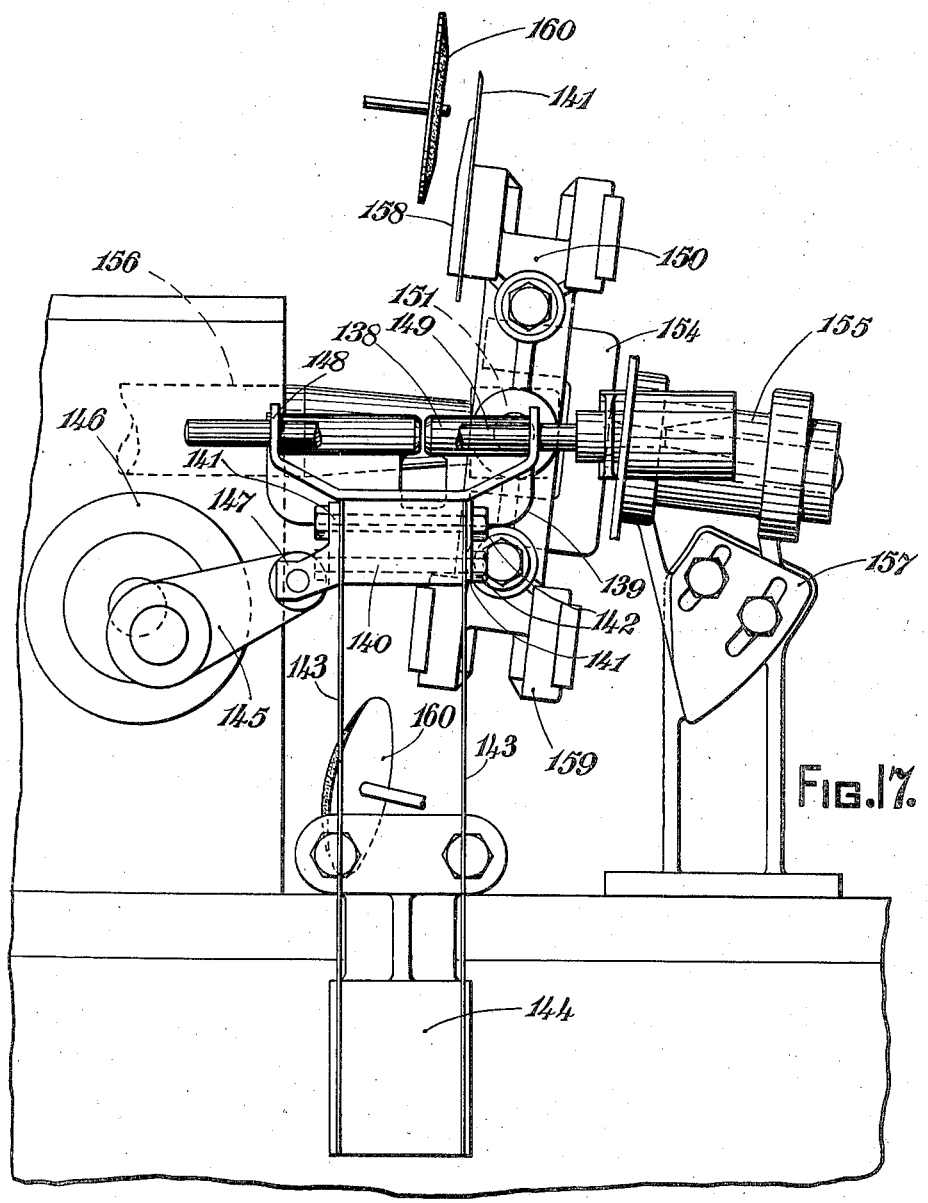

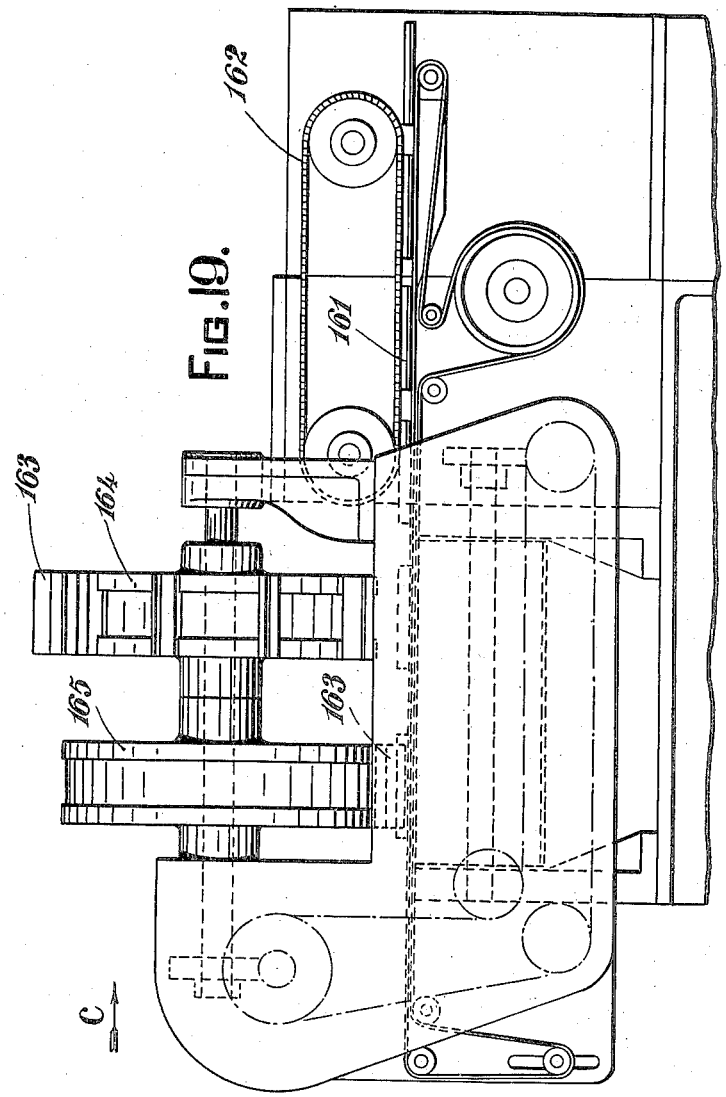

Patented Jan. 31, 1939

2,145,528

UNITED STATES PATENT OFFICE 2,145,528

MANUFACTURE OF FILTER PLUGS OR WADS FOR CIGARETTES

Félix Frédéric Ruau, Deptford, London, England, assignor to Molins Machine Company, Limited, London, England Application August 24, 1936, Serial No. 97,683 In Great Britain September 10, 1935

18 Claims. (Cl. 93—1)

This invention is for improvements in or relating to the manufacture of filter plugs or wads, for example, plugs or wads for use with cigarettes at that end of the cigarette which is to be placed in the mouth.

In some cases plugs or wads are manufactured from strips of material, such strips comprising layers of creped or corrugated paper. The strips are extensible transversely of their length, and consequently, when the paper is corrugated, the length of the corrugations extends transversely of the width of the strips. If desired, the layers of creped paper may be interposed by absorbent cellulosic material.

When such plugs or wads are used with cigarettes the plugs or wads are sometimes arranged so that smoke from the cigarettes is filtered. It is, however, to be understood that where the term filter plug or wad is used herein, it is to include plugs or wads that are capable of filtering smoke when the plugs or wads are used with cigarettes, but that it is not to be limited to plugs or wads which are capable of acting as complete smoke filters; for instance, where the plugs or wads comprise layers of creped paper with or without interleaved layers of absorbent material it will be appreciated that a complete filtering of the smoke is not obtained since some of the smoke can pass through the small channels in the plugs. Where, however, the plugs or wads are made of layers of absorbent material a more complete filtering is obtained.

Where herein the term "strip" is used in connection with material from which plugs or wads are to be made, it shall mean material which is longer than it is wide.

In one form the strips comprise three layers of creped paper interleaved with two layers of absorbent cellulosic material. The length of the strips is approximately 66 centimetres, and the width approximately 44 millimetres.

The strips are obtained by severing them from a length of material, for example, a sheet or a web comprising layers the width of which sheet or web is equal to the length of the strips, and the sheet or the web is extensible in a lengthwise direction, and, consequently, when the strips are severed from the end of the sheet or the web the strips are extensible transversely of their length. The material from which the plugs or wads are made is referred to for convenience as "wad material."

According to the present invention, there is provided a machine for forming filter plugs or wads comprising in combination mechanism to move wad material in strip form (e. g. wad material comprising superimposed layers of crepe paper with or without interposed layers of absorbent material) lengthwise and simultaneously to fold and/or compress the strip to substantially the desired cross-section and a forwarding conveyor to receive the folded and/or compressed wad material delivered by said mechanism, the said forwarding conveyor being arranged to move the wad material together with wrapping material through mechanism arranged to fold and secure the wrapping material about the wad material. The mechanism may comprise a feed conveyor (e. g. an endless band), means disposed above the feed conveyor to engage the wad material between the longitudinal edges thereof to prevent the mid-portion from rising, a guide element or elements to engage and raise the longitudinal edge portions of the wad material, and a passage through which the wad material with its edge portions raised is passed and in which the wad material is compressed to substantially the desired cross-section (e. g. to a cross-section smaller than that of the final plug or wad).

One form of machine for carrying the invention into effect will now be described with reference to the accompanying drawings, in which:—

Figure 2a is a plan of Fig. 1a;

Figure 3 is an elevation drawn to an enlarged scale looking in the direction of the arrow A, Fig. 2b;

Figure 7a is an enlarged detailed view of a portion of Figure 7 with certain parts removed for the sake of clearness of illustration of the gripper devices;

Figures 8 to 11 are sections drawn to an enlarged scale and taken on lines 8—8, 9—9, 10—10, 11—11 respectively of Fig. 1b;

Figures 12 to 14 are sections drawn to an enlarged scale and taken on lines 12—12, 13—13, 14—14 respectively of Fig. 1a;

Figure 15 is a side elevation drawn to an enlarged scale of mechanism for drying the seam of the endless wrapper which is formed about the filter wads;

Figure 17 is a side elevation drawn to an enlarged scale of cutting mechanism for cutting the wrapped filter rods into desired lengths;

Figure 18 is a plan of Fig. 17, some parts being removed and others shown in a position different from that in which they are shown in Fig. 17;

Figure 19 is an elevation drawn to an enlarged scale showing the mechanism for delivering the severed filter wad lengths to collecting mechanism;

Like references refer to like parts throughout the specification and drawings.

Referring to Fig. 3 of the drawings, the material from which the filter wads are to be formed is fed as a web 23 from a reel of material (not shown). The web of material comprises three superimposed layers of crepe paper, interleaved with two layers of absorbent cellulosic material, and the width of the reel is approximately 66 centimetres.

Figure 5:
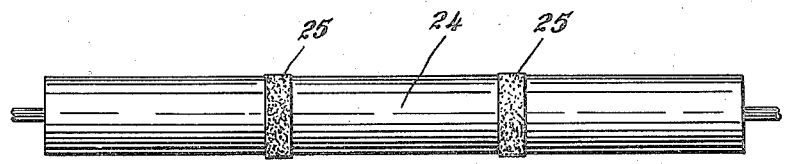
Figure 5 shows a detail of Fig. 3.

The web is fed intermittently towards a cutting device, described below, and it is found that there is a tendency for the lower layers of the web to lag behind the upper layers during the feeding operation. To reduce this tendency the web is passed over a roller 24, which is rotated continuously and is provided at intervals along its length with roughened surfaces 25, Fig. 5, which feed the lower layers of the web forwardly, thus keeping the superimposed layers of material in their desired relative position.

The roller 24 is rotated so that the surface of the roller which engages with the web 23 moves in the same direction as the direction in which the web is being moved and operates to tension the web in the direction of movement of the web. The roughened surfaces are provided by strips of emery cloth secured to the roller.

Figure 7:
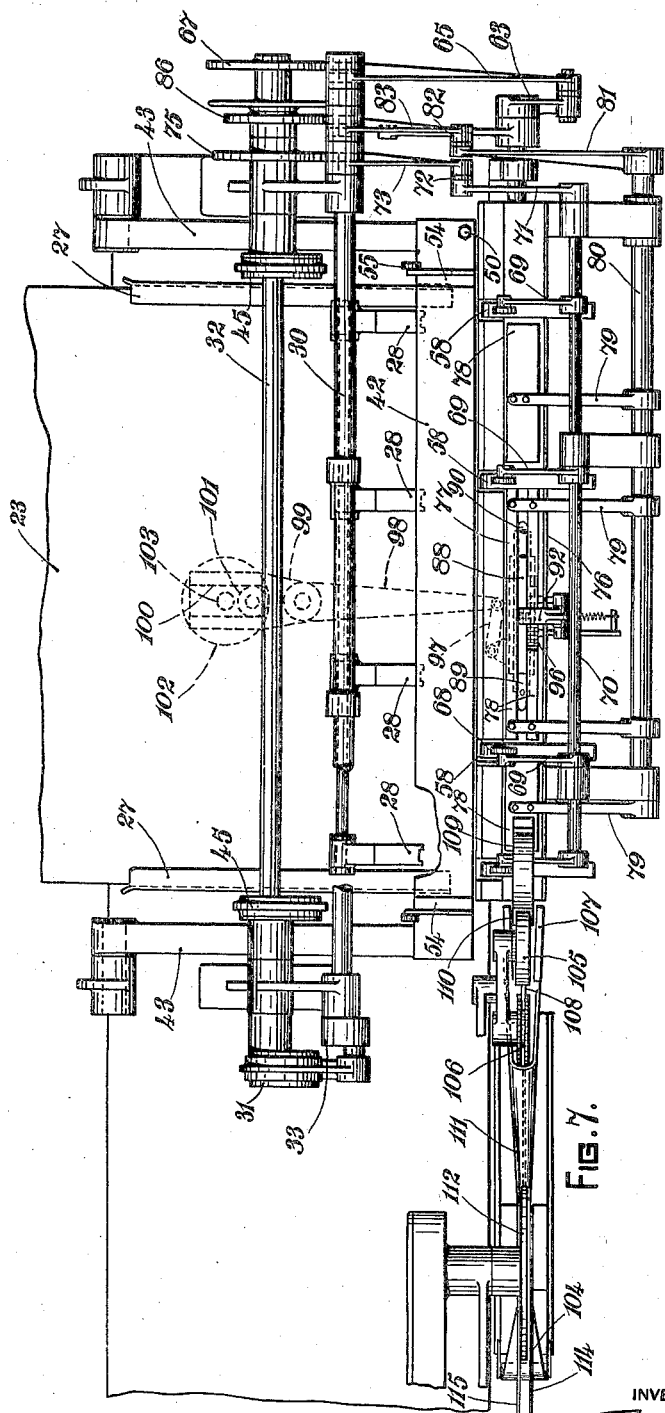
Figure 7 is a plan of Fig. 6.

The web 23 is moved over a guide plate 26 and between the side guides 27, Fig. 7, which are of U shape and enclose the longitudinal edges of the web, so as to control the web laterally whilst it is being moved towards the cutting device.

Figure 4:
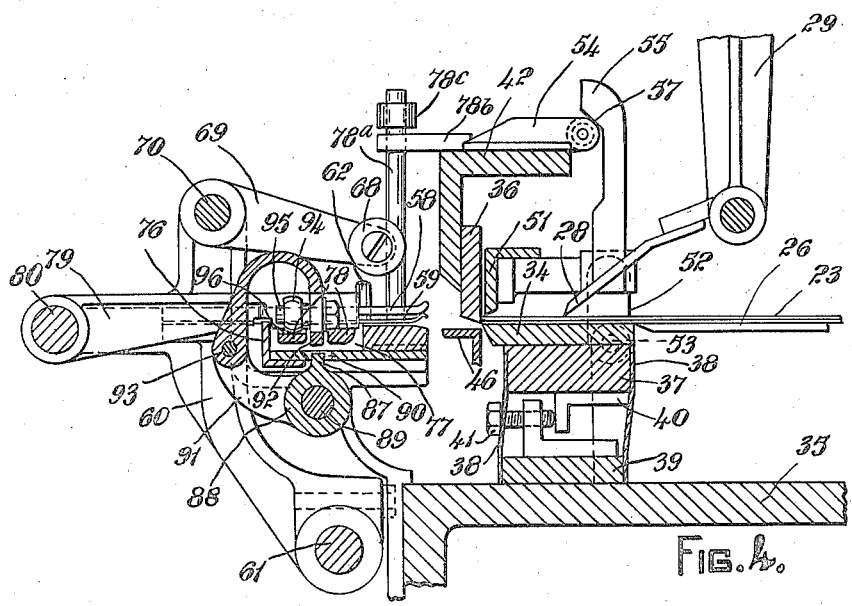
Figure 4 is a sectional view of a part of Fig. 3.

Feeding elements 28, Figs. 3 and 4, mounted on arms 29 secured to a shaft 30 are reciprocated to move the web 23 intermittently towards the cutting device. The shaft 30 is oscillated about its longitudinal axis by an eccentric strap 31 mounted on a shaft 32, driven from the main drive of the machine. A link 33 connects the shaft 30 with the eccentric strap 31. At each cutting operation a strip approximately 44 millimetres wide is severed therefrom, and it will be seen, therefore, that each strip severed from the web is approximately 66 centimetres long and 44 millimetres wide. As will be seen in Fig. 3, the link 33 is provided with a slot and the eccentric strap 31 carries a pin 31a which engages with the slot in the link 33. If it is desired to alter the width of the strips being severed from the web, it is only necessary to alter the position of the eccentric strap and consequently that of the pin carried thereby relatively to the slot in the link 33.

The cutting device for severing strips from the web 23 comprises a knife 34, Fig. 4, which is secured to the bed 35 of the machine by a resilient connection, described below, and a knife 36 mounted for reciprocation in a vertical plane and arranged to cooperate with the knife 34. The cutting edges of the knives 34 and 36 are arranged at an angle one to the other, so that one edge of the web 23 is first cut by the cooperating knives and the cut gradually extends across the web until a strip has been severed therefrom, the cutting action of the knives being similar to that of a pair of scissors. The knife 34 is mounted on a block 37, which is fixed to flat spring plates 38, two of said plates being attached to each end of the block 37 and spaced apart from each other and extending lengthwise of the cutting edge of the knife 34. The spring plates are fixed at their lower ends to rigid members shown as blocks 39 secured to the bed 35 of the machine.

Those portions of the knives 34 and 36 which first cooperate with each other are provided with a lead or chamfer so that the knives may be moved past each other and not tend to jam at the commencement of the cutting operation as they would do if such provision were not made. When the reciprocable knife 36 is moved into engagement with the yieldably mounted knife 34, the cutting edge of the knife 36 engages with the edge of the knife 34 and gradually causes the knife 34 to move to the right, as viewed in Fig. 4. Since the knives are angularly inclined to one another, that end of the knife 34 which is first engaged by the knife 36 first moves to the right the other parts of the knife 34 moving as they are in turn engaged by the knife 36. When setting the apparatus the spring plates 38 are given an initial tension, as shown in Figs. 3 and 4, and by this means the cooperating edges of the knives 34 and 36 are automatically maintained in correct relationship with respect to each other during the cutting operation. In order to provide the initial tension in the springs 38, angle pieces 40 are secured to each end of the block 37, and adjusting screws 41 carried in angle pieces fixed to the blocks 39 are provided and are operative upon the angle pieces 40 to effect the adjustment.

Figure 6:
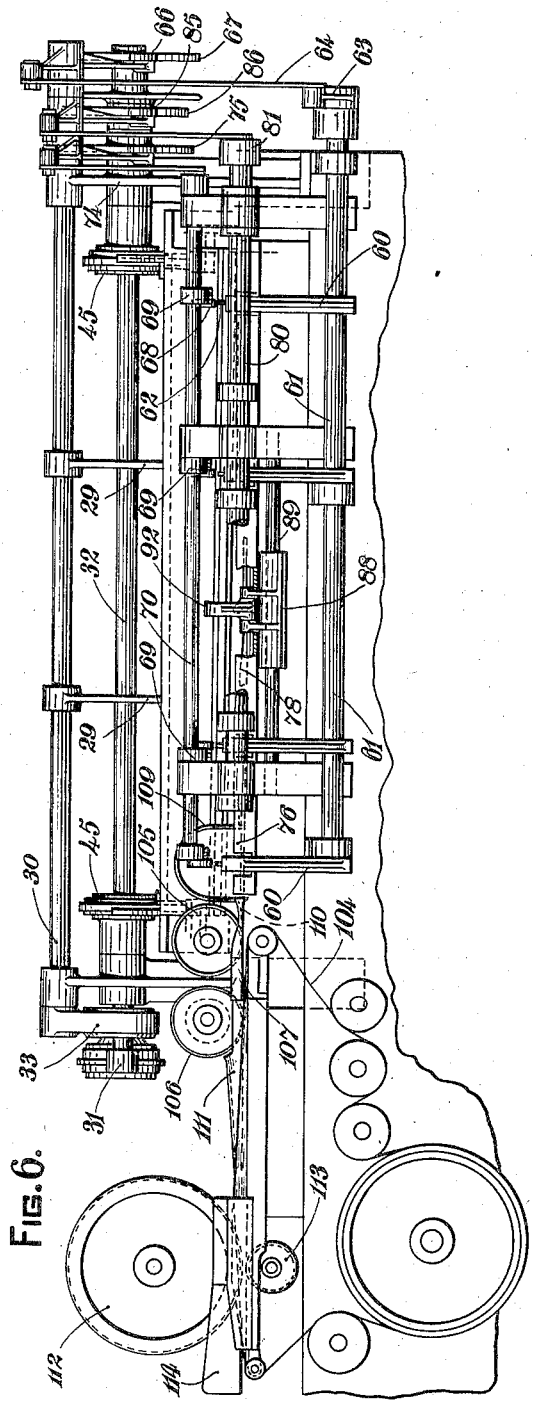
Figure 6 shows a part of Fig. 1b, drawn to an enlarged scale.

The knife 36 is secured to an angle piece 42, which is connected with levers 43 pivoted at 44. A pair of eccentric straps 45, see Figs. 6 and 7, are connected with the shaft 32 and with the levers 43.

Figure 4A:
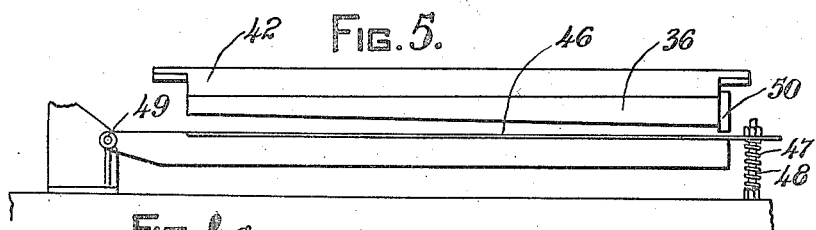
Figure 4a is a view showing a detail of Fig. 4.

As the web 23 is fed forwardly to the cutting position, the leading portion of the web is supported by a plate 46, Fig. 3, the supporting surface of the plate during this time being arranged at substantially the same level as the surface of the plate 26, over which the web 23 is being moved. Before the cutting operation takes place, the plate 46 is moved downwardly out of the range of action of the cooperating knives 34 and 36. To enable the plate 46 to be moved downwardly out of the range of action of the knives 34 and 36 one end of the plate 46 is pivoted at 49, Fig. 4a, and the other end is slidably mounted on a vertical rod 47 fixed to the bed 35 of the machine, and springs 48 are provided to urge the plate towards the position shown in Fig. 3 of the drawings. At that end of the plate 46 which is slidably mounted, a projection 50 secured to the angle piece 42 engages with and depresses the plate 46, Fig. 4a. The projection 50 is arranged so that as the knife 36 descends, it engages with the plate 46 before the knife 36 cooperates with the knife 34.

In order to prevent the web 23 from moving forwardly during the cutting operation, a pressure member 51, Fig. 4, is provided and is connected with a link 52 pivoted at 53 to the bed of the machine. The pressure member 51 is oscillated by the knife 36, a projecting member 54 being secured to the angle piece 42 to which the knife 36 is secured, and engaging with a cam 55 connected with the link 52. As the knife 36 descends, the projection 54 engages with the depression in the cam 55, and a spring 56, Fig. 3, causes the pressure member 51 to engage with and grip the web 23 between the member and the upper surface of the knife 34. As the knife 36 moves upwardly, the projection 54 engages the surface 57 of the cam 55, thereby causing the pressure member 51 to release the web 23 ready for the next feeding action.

Before the knives 34 and 36 operate to sever a strip from the web 23, a gripping device comprising a plurality of gripping members is arranged to grip the leading end of the web 23. Each of the gripping members comprises a pair of cooperating elements of which one is movable relatively to the other. One of the cooperating elements is a fixed element 58 and the other is a resilient element 59. The resilient part 59 consists of a flat spring which is connected at one end to the fixed element 58. The fixed element 58 and the resilient element 59 are connected with an arm 60 secured to a shaft 61. A projection 62 is secured to the resilient member 59 and projects through an aperture in the fixed member 58 for a purpose which will be described below. The arm 60 is oscillated about the axis of the shaft 61 so that the gripping members are movable in an arcuate path which is transverse to the length of the strip of material which is severed from the web 23. A link 63 is secured to the shaft 61 and to a link 64, the link 64 being also connected with one arm of a bell crank lever 65, the other arm of the bell crank lever carrying a roller 66 which engages with a cam 67. The cam 67 causes the arm 60 to move in an arcuate path about the axis of the shaft 61, and as the grippers move into position to grip the leading end of the web 23, a roller 68 carried on an arm 69 fixed to a spindle 70 moves downwardly and engages with the projection 62, thus depressing the projection and causing the gripper to open, so that the end portion of the web 23 is inserted between the resilient member 59 and the fixed member 58. The roller 68 is then lifted out of engagement with the projection 62 so that the end portion of the web 23 is held by grippers at points along the width of the web. When, therefore, the strip is severed from the web, the strip will be gripped at points along its length. The arm 69 is operated by a link 71, one end of which is connected with the spindle 70, the other end being connected with a further link 72, Fig. 7, which is connected to one arm of a bell crank 73, the other arm of the bell crank carrying a cam roller 74, Fig. 6, which engages with a cam 75 on the shaft 32.

When a strip has been severed from the web 23, the arm 60 moves to the left, as viewed in Figs. 3 and 4, and the strip of material which is carried by the grippers is located against the side 76 of a trough 77. When the strip has been located against an abutment formed by the side 76 of the trough, the continued movement of the grippers to the left in these figures causes the strip to be withdrawn from between the members 58 and 59.

As the strip is moved towards the side 76 of the trough 77 it passes beneath a pressure element 78, the purpose of which is described below. It is sometimes found in practice that the strip buckles between the points at which it is gripped and that when this occurs there is a tendency for the strip to foul the pressing element 78. To remove this objection small weights 78a, Fig. 4, are arranged freely to slide in bearings 78b carried by the angle piece 42, and are disposed so that they engage the material at points between the grippers. The weights 78a engage the end portion of the web as the knife 36 moves downwardly and remains in contact therewith after the strip has been severed from the web and whilst the grippers are moving the strip towards the side 76 of the trough 77. The weights 78a are lifted out of the path of the web as it is moved into position to enable a further strip to be severed from the web by the knife 36 as it is moved upwardly, the bearings 78b engaging with collars 78c fixed to the weights 78a.

When the material comprising the web consists of layers of crepe paper interposed with layers of cellulosic material it is found that the strips are more easily deposited in the trough 77 if the grippers are arranged to operate in succession lengthwise of a strip starting at one end thereof to release the strip. In the construction being described, the strips are released from the gripping device due to the fact that one longitudinal edge of a strip is arrested by the abutment 76 while the movement of the gripping device is continued. As shown in Figure 7, and indicated more clearly in Figure 7a, the individual gripper members 58 are arranged in a manner such that, commencing from one end of a strip, the successive gripper members engage a greater part of the width of the strip.

As shown in Figure 7a, a strip S is gripped by the four grippers 58, and the arrangement is such that each of the grippers considered successively from the left-hand side of the figure, engages with a greater area of the strip than does the preceding gripper. Thus it will be seen that the gripper at the left-hand side engages only a small part of the width of the strip S, whereas the gripper at the right engages a considerably greater area of the strip. In other words, it might be said that the foremost edges $A^1$, $A^2$, $A^3$, and $A^4$ of the grippers 58 are successively nearer to the edge E of the strip S commencing from the left-hand side of the figure. It will be seen therefore that when the forward edge B of the strip S engages with the abutment 76 on the trough 77, the continued movement of the gripping device causes the first gripper to release the strip S, the succeeding grippers being thereafter released in order from left to right as the gripping device moves further away from the abutment against which the edge B is located.

Each strip thus deposited in the trough 77 is engaged by a pressing member 78, which is connected to arms 79 fixed to a shaft 80. The pressing member 78 is provided with a slot or aperture the purpose of which appears below. Whilst the strip is being inserted into the trough 77, the pressing member 78 is held in a position such that it does not impede the strip when the strip is substantially flat, but when the strip is in the trough, the pressing member is lowered into engagement with the strip. The arms 79 to which the pressing member 78 is connected are operated by a link 81, one end of the link being fixed to the shaft 80, whilst the other is connected with a further link 82, which link is in turn connected with one arm of a bell crank lever 83, the other arm of the bell crank lever carrying a roller 85 which engages with a cam 86.

When the pressing member 78 has engaged the strip in the trough 77, the strip is engaged and gripped by a conveyor which moves the strip lengthwise out of the trough. The conveyor which engages and grips the strip comprises two elements disposed above and below the strip respectively, and movable relatively to one another to grip the strip in timed relationship with the gripping device above described. One of the elements comprises a projection 87, Fig. 4, on a carriage 88, which carriage is slidably mounted on a shaft 89. The projection 87 protrudes through an aperture 90 in the bottom of the trough 77, and that surface of the projection 87 which engages with the strip of material is provided with a roughened surface, for example, a piece of emery cloth is secured to the surface. The carriage 88 is provided with an arm 91, and an element 92 which co-operates with the projection 87 is pivoted at 93 to the arm 91. The element 92 is arranged to project through an aperture in the pressing member 78, and that surface of the element 92 which engages with the strip of material is roughened in a manner similar to that in which the projection 87 is roughened. A roller 94 mounted for rotation about a pin 95 is connected with the element 92, and the roller 94 engages with a cam surface 96, which is formed on or secured to the upper surface of the pressing member 78. The roller 94 and cam 96 cause the element 92 to pivot about the point 93 and thereby to grip and release a strip at the desired times. The carriage 88 is reciprocated along the shaft 89 by a link 97, Fig. 7, one end of which is connected with the carriage 88, the other end being connected with a further link 98, which is also connected to a bracket 99, the bracket 99 being provided with a slide 100. A roller 101 is connected with a disc 102, the disc being secured to a shaft 103 which is driven from the main drive of the machine. As the roller 101 rotates with the disc 102, it moves in the slide 100 and imparts to the carriage 88 the desired reciprocating movement. The carriage 88 after a strip has been gripped by the projection 87 and the element 92 is moved to the left of Figs. 6 and 7, thereby conveying the strip lengthwise out of the trough 77, and delivering it to a feed conveyor 104.

The feed conveyor 104 comprises an endless band, and above the point at which the strip is delivered to the band by the members 87 and 92 there is placed a roller 105 which is rotated in a direction such that the surface of the roller which engages with the strip is moving in the same direction as the direction in which the strip and conveyor 104 are moving. The feed conveyor 104 carries the strip beneath a further roller 106 and through guide elements 107, Fig. 8, which engage with the longitudinal edge portions of the strip and guide them towards a strip engaging member 108, Fig. 9, which is disposed above the feed conveyor and which engages with the strip at approximately the centre or mid-portion thereof and prevents the mid-portions of the strips from rising, and in the construction shown retains the mid-portion pressed against the feed conveyor 104. The roller 106 has a peripheral groove through which the member 108 extends. The rollers 105 and 106, as will be seen, also act to prevent the mid-portion of the strips from rising and therefore the parts 105, 106 and 108 all operate to keep the mid-portions of the strips from rising, although the main function of rollers 105 and 106 is to feed the strips. Further, the periphery of roller 106 may be knurled to assist in the feeding of the strip. The periphery of roller 105 may or may not be knurled as desired. It is preferable that at least the periphery of one of the rollers 105 and 106 is knurled or otherwise roughened. A foot 110, Fig. 6, carried by a suitable support 109 is arranged so that the foot 110 engages with the upper surface of the strip as it is delivered to the feed conveyor 104, and holds the rear portion of the strip in a flat condition as the feed conveyor passes the strip to the guide elements 107. As the feed conveyor 104 carries the strips through the guide elements 107, the edge portions of the strips are raised and guided inwardly towards the strip engaging means 108, see Figs. 8, 9 and 10. An arcuate tongue piece 111 is provided above the strips, and this tongue piece 111 is provided with a central partition, this partition being the strip engaging member 108. The tongue piece 111 is provided with an angular support 211 which is secured to a bracket 212 by a locking screw 213, the bracket 212 being secured to the bed of the machine by means of a bolt 214. The angular support 211 is provided with a slot 215 so that the tongue piece 111 may be adjusted transversely to the direction of movement of the conveyor 104. The bracket 212 is provided with a slot as indicated at 216 so that the tongue piece may be adjusted towards and away from the conveyor 104.

The guide 111 is tapered, that part of the guide with which the longitudinal edges of the strip first engage being of larger cross-section than that with which they finally engage, the difference in cross-section being illustrated in Figs. 9 and 10. As the dimensions of the guide 111 gradually become smaller, the longitudinal edges of the strip are guided upwardly until they reach that part of the guide with which the strip engaging surface 108 is connected, and the edges of the strip then tend to turn downwardly as shown in Fig. 10. The guide 111, together with the feed conveyor 104 and a pair of rollers 112 and 113, Fig. 11, which rollers have concave peripheries, forms a passage in which the strips are compressed to a cross-section which is smaller than that which it is desired that the final product shall have. The reason for compressing the strip material to a cross-section which is smaller than that of the final product is to break down some of the natural resiliency of the material, because it is found that unless this is done there is a tendency for the material to burst open the seam of the tubular wrapper in which the material is enclosed.

The roller 113 is one of the rollers over which the feed conveyor 104 passes and the roller 112 is disposed opposite to the roller 113 and is movable at the same speed as and in the same direction as the roller 113. Since the feed conveyor 104 passes over the roller 113, it will be seen that the speed and direction of movement of the wad material and the roller 112 are the same. The rollers 112 and 113 together with the feed conveyor 104 grip the filter material and feed it forward to the forwarding conveyor 118 referred to below.

Figure 1A:
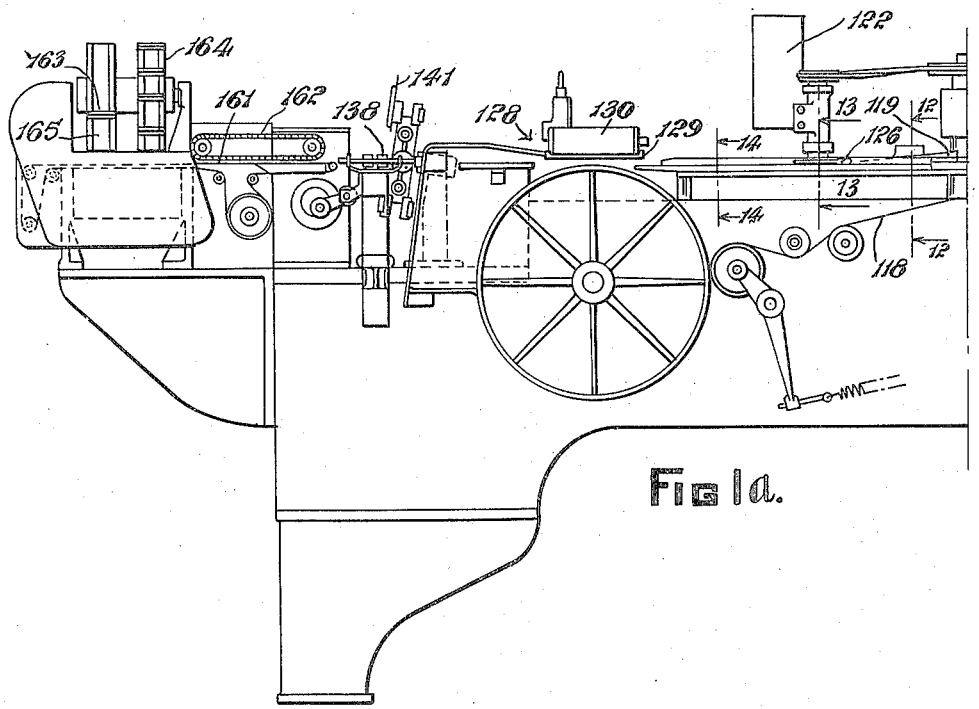
Figure 1a shows in side elevation one-half of the machine.
Figure 1B:
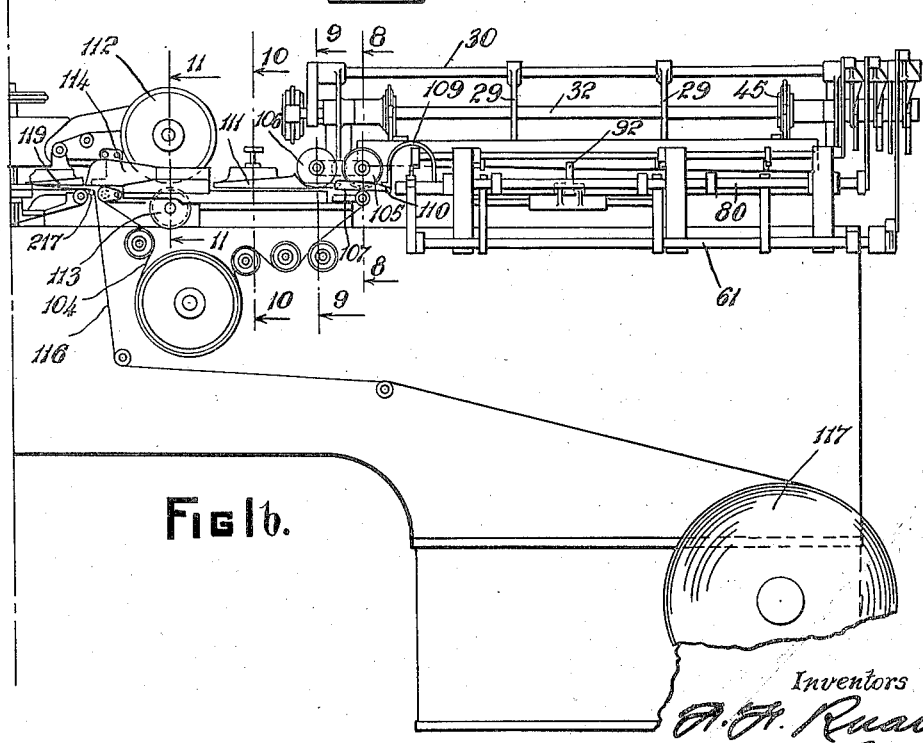
Figure 1b shows in side elevation the other half of the machine.

As will be seen from Fig. 1b, the feed conveyor 104 at this point begins to flatten out, and in order to retain the formation of the strip, a pair of guides 114 and 115 are provided, and engage with the formed strip until it is delivered on to the surface of an endless web 116 of wrapping material, which is fed from a reel 117.

In practice it is found that the final product frequently does not have a formation resembling that shown in Figs. 10 and 11, but that the strips are folded in a haphazard form. Although it is desirable that the final product shall have a form resembling that shown in Figs. 10 and 11 as closely as possible, the haphazard formation is found to form satisfactory plugs or wads.

Figure 2A:
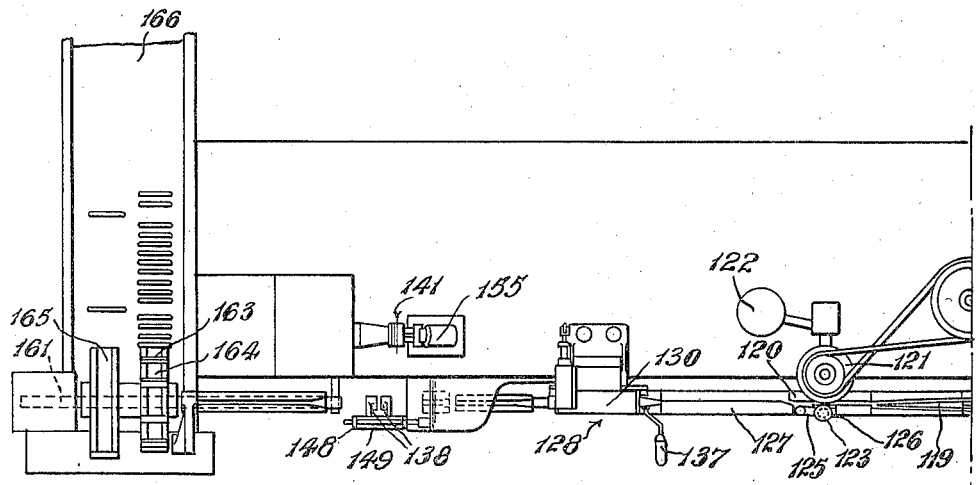
Figure 2B:
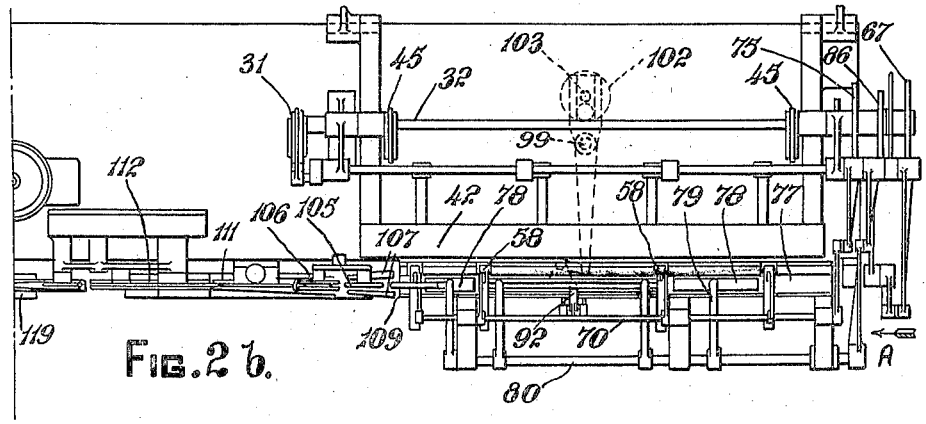
Figure 2b is a plan of Fig. 1b.

The feed conveyor 104 delivers the formed strip to the wrapping material 116, the material 116 passing over a roller 217 and being engaged by a forwarding conveyor 118 which comprises an endless band. The forwarding conveyor 118 carries the strip together with the endless wrapping material 116 beneath two tongue members 119, which are tapered as shown in Fig. 1b, and which serve to guide the formed strips until wrapping material 116 is partly folded about the strips. If desired, instead of two relatively short members 119, one relatively long member may be used, but it is found that two short members are more easy to manufacture and better provide for the adjustment and maintenance of the machine. The wrapping material 116 and the strip is then carried by the forwarding conveyor 118 past a folder 120, which folds one longitudinal edge of the wrapping material into engagement with the formed strip, as shown in Fig. 13. The other longitudinal edge of the wrapping material is left upstanding, as shown in Fig. 13, and is engaged by an adhesive applying wheel 121 which receives adhesive from a container 122, see Figs. 1 and 2.

A roller 123, Fig. 13, freely mounted on a pin 124 presses the upstanding edge of the wrapping material against the adhesive applying wheel 121. The pin 124 about which the roller 123 is mounted is carried by an arm 125 and a spring 126 presses the arm 125 towards the adhesive applying wheel 121 so that the roller 123 presses the upstanding edge of the wrapping material against the wheel 121.

After adhesive has been applied to the longitudinal edge of the wrapping material, a further folder 127, Fig. 14, folds the upstanding portion of wrapping material downwardly into engagement with the previously folded portion, thus forming a continuous wrapper about the strips.

The strips are delivered to the feed conveyor 104 in succession, so that the leading end of one strip abuts against the foremost end of the preceding strip, thus when the continuous wrapper is formed about the succession of strips, a rod of wrapped filter plugs or wads is formed. The rod so formed is passed beneath a heating element 128, see Figs. 15 and 16. The heating element comprises a coil of resistance wire, not shown, and a bar 129 made from good heat conducting material. The heating element is mounted in a cylindrical casing 130 and the bar 129 extends beyond the cylindrical surface thereof. The casing 130 is secured by a bolt 131 to an arm 132 which is mounted on a spindle 133 carried upon a standard 134 supported upon the bed of the machine.

Figure 16:
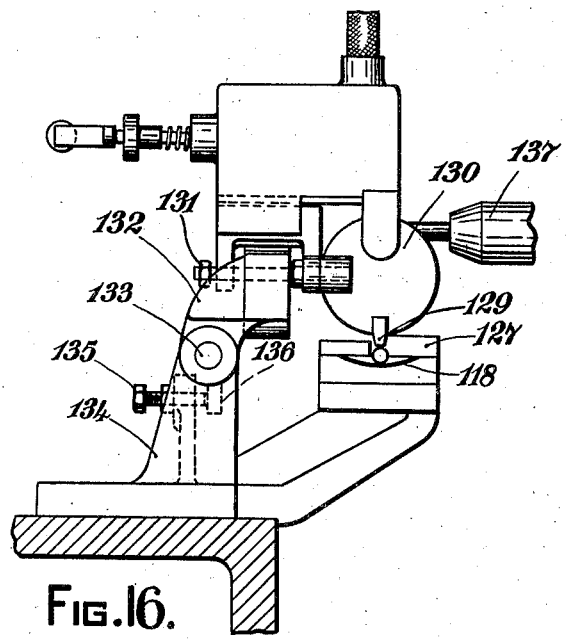
Figure 16 is an elevation of Fig. 15, looking in the direction of the arrow B.

The position of the arm 132 may be adjusted by means of an adjusting screw 135, adapted to engage with the projection 136 formed on the arm 132. Secured to the casing 130 is a handle 137, by which the heater may be moved about the axis of the spindle 133, so as either to rest, as shown in Fig. 16, upon the overlapping edges of the wrapping material 116, or be raised into a position out of engagement with the rod. After passing the heating element 128, which dries the adhesive and secures the seam of the continuous tubular wrapper, the rod passes to a cutting device which severs the rod into the desired lengths.

One form of device suitable for cutting the rod into the desired lengths is shown in Figs. 17 and 18, and the rod passes from the heater into tubular members 138, the tubular members being spaced apart as shown in Fig. 17, and are carried by downwardly projecting flanges 139, which merge into a block 140. The tubular members 138 are spaced apart by a distance sufficient for the knife blade 141 to pass between the members and effect cutting of the rod.

The block 140 is rigidly attached by plates 141 and bolts 142, to wide flat springs 143, the lower ends of the flat springs being rigidly attached to a projection 144, which projects from the frame of the machine.

The tubular members 138 are oscillated by a connecting rod 145 driven by a crank disc 146, the connecting rod also being attached to an extension 147 of one end plate 141. The bearings at each end of the connecting rod 145 are preferably in the form of totally enclosed ball races, which are lubricated at intervals by being packed with grease in any known manner. When the crank disc 146 rotates, the springs 143 bend and permit the tubular members 138 to oscillate, whilst maintaining the tubular members so that their axes remain in a substantially horizontal plane. A bracket 148 is mounted on the block 140, and embraces a rod 149 fixed to the frame of the machine so that if one of the springs 143 should break during the operation of the machine, the tubular members 138 are prevented from falling from their normal path. The knife 141 is carried by a bar 150, which is pivoted on a pin 151. The bar 150 comprises two links arranged one on either side of a yoke 154, the links being maintained in position by bridge pieces 152, each bridge piece having a pin 153 secured at its centre. The pins 153 fit into holes in the yoke 154, which is carried in a bearing 155, arranged at an angle to the main shaft 156 of the cutting apparatus. The inclination of the bearing 155 is adjustable by means of a quadrant 157. The knife blade 141 is clamped to the bar 150 by means of a holder 158, and a counter-weight 159 is provided at the other end of the bar 150.

When the main shaft 156 is rotated, the pin 151 transmits rotary motion to the bar 150 which in turn through the bridge pieces 152 and pins 153 imparts rotary movement to the yoke 154, and due to the angular displacement of the yoke the blade 141 receives a reciprocating movement which is equal in speed to the linear speed of the rod, and during the time the blade is cutting through the rod the plane of the blade is substantially at right angles to the axis of the rod. Grinding elements in the form of rotatable discs 160 are provided to engage with the blade 141 and to keep the blade sharp.

The tubular members 138 are moved in synchronism with the knife 141 so that at the time of cutting of the rod the tubular members are moving in the same direction as the rod and at the same speed as that at which the rod is moving.

Figure 20:
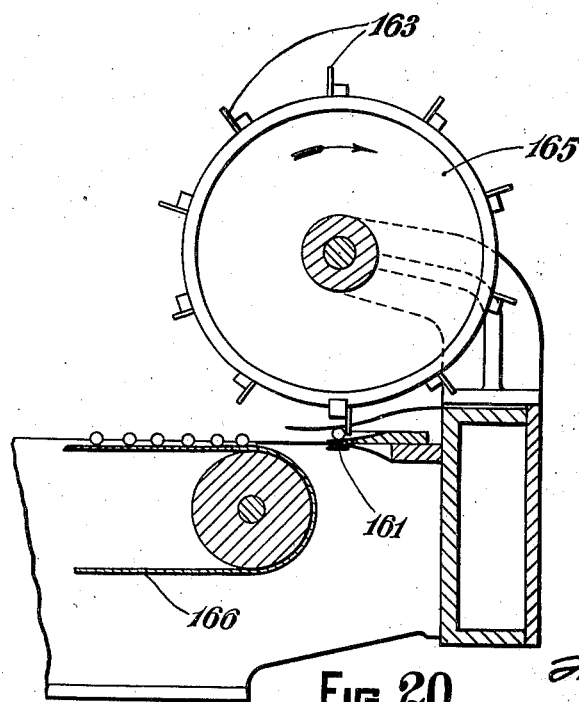
Figure 20 is a view of Fig. 19, looking in the direction of the arrow C, Fig. 19.

The severed lengths are delivered to a conveyor 161 (see Figs. 19 and 20) and the conveyor 161 moves with a surface speed which is greater than the linear speed of the rod, so that successive severed lengths are spaced apart from one another. Movable bands 162 are provided and engage with the severed lengths as they pass to the conveyor 161, the bands 162 being moved at the same speed as that of the conveyor 161 and assisting in the spacing of the severed lengths. The severed lengths are carried by the conveyor 161 into a position such that they are engaged by one of the vanes or blades 163 carried by one or other of a pair of rotatable drums 164 and 165.

As previously stated, the width of the web from which the strips are severed is 66 centimetres, so that the length of each strip contained in the rod is 66 centimetres. Each filter wad length which is severed from the rod is 66 millimetres in length, thus each formed strip of filter material is divided into ten lengths. As it is not always possible to determine exactly where one strip is adjacent the next in the rod, the strips are severed so that one length in each ten successive lengths contains the two end portions of strip material. The drum 165 is provided with only one vane 163, and this blade is arranged to deflect the severed lengths which contain the end portions of strip material, whilst the drum 164 is provided with nine blades 163 and is arranged to deflect the remaining severed lengths, all of the severed lengths being delivered in rows on to a band 166. In this way the lengths containing the end portions of strip material are separated from the remaining lengths delivered from the cutting mechanism.

Instead of the lengths severed from the rod being 66 millimetres, as just described, it will be appreciated that if desired the lengths cut from the rod may be each equal to the length required for use with a single cigarette, or they may if desired be of a length required for two cigarettes. The 66 millimetre lengths above referred to are lengths which are equal to the length required for six single cigarettes, and these multiple lengths are again severed when being assembled with cigarettes. It is desirable, however, that the end portions of successive strips be contained in one length and that these lengths be separated from the remainder of the product of the machine.

The mechanism shown in the drawings for gripping and feeding the strips to the conveyor 104 is described and claimed per se in copending U. S. application Serial No. 97,686 of even date.

What I claim as my invention and desire to secure by Letters Patent is:—

1. In a machine for forming wads, mechanism to enclose an axially moving core in a continuous tubular wrapper, means to feed wrapping material to said mechanism, a conveyor to deliver wad material to the wrapping material, shaping elements cooperating with said conveyor to form the wad material to a cross-section approximating to that of the final wad before delivery of the wad material to the wrapping material, and a cutting device to sever lengths from the axially wrapped core.

2. In a machine for forming wads, mechanism to enclose an axially moving core in a continuous tubular wrapper, means to feed wrapping material to said mechanism, a conveyor to deliver strips of wad material lengthwise to the wrapping material, shaping elements cooperating with said conveyor to form the wad material to a cross-section approximating to that of the final wad before delivery of the wad material to the wrapping material, and a cutting device to sever lengths from the axially wrapped core.

3. In a machine for forming wads, mechanism to enclose an axially moving core in a continuous tubular wrapper, means to feed wrapping material to said mechanism, a forming passage disposed in advance of said mechanism and arranged to form wad material to a cross-section approximating to that of the final wad, a conveyor to move wad material lengthwise through the forming passage and to deliver the wad material to the wrapping material, and a cutting device to sever lengths from the axially wrapped core.

4. In a machine for forming wads, mechanism to enclose an axially moving core in a continuous tubular wrapper, a forming passage disposed in advance of said mechanism and arranged to form wad material to a cross-section approximating to that of the final wad, a conveyor to move strips of wad material lengthwise in succession through the forming passage and towards said mechanism, and shaping elements disposed in advance of the passage and above the conveyor partly to fold the material before the latter enters said passage.

5. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, and means to compress the folded material.

6. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, a partition disposed between the raised portions and cooperating with said last named means to direct the raised portions toward that portion of the material which is engaged by the conveyor, and means to compress the folded material.

7. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, and a pair of opposed surfaces movable at the same speed and in the same direction as the wad material to compress the folded material.

8. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, a partition disposed between the raised portions and cooperating with said last named means to direct the raised portions toward that portion of the material which is engaged by the conveyor, and a pair of opposed surfaces movable at the same speed and in the same direction as the wad material to compress the folded material.

9. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips and means to compress the folded material, and means to keep the wad material flat on the conveyor as the latter moves the material to said shaping elements.

10. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, a partition disposed between the raised portions and cooperating with said last named means to direct the raised portions toward that portion of the material which is engaged by the conveyor, and means to compress the folded material, and means to keep the wad material flat on the conveyor as the latter moves the material to said shaping elements.

11. In a machine for forming wads, the combination with mechanism to enclose an axially moving core in a continuous tubular wrapper, of a conveyor to move strips of wad material lengthwise towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, and a pair of opposed surfaces movable at the same speed and in the same direction as the wad material to compress the folded material, and means to keep the wad material flat on the conveyor as the latter moves the material to said shaping elements.

12. In a machine for forming wads, mechanism to enclose an axially moving core in a continuous tubular wrapper, a forming passage disposed in advance of said mechanism and arranged to form wad material to a cross-section approximating to that of the final wad, the walls of said passage being movable at the same speed and in the same direction as the wad material, and a conveyor to move strips of wad material lengthwise through the forming passage and towards said mechanism.

13. In a machine for forming wads, the combination with mechanism to enclose an axially moving core in a continuous tubular wrapper, of a forming passage disposed in advance of said mechanism and arranged to form wad material to a cross-section approximating to that of the final wad, a conveyor to move strips of wad material lengthwise through the forming passage and towards said mechanism, and means to engage and raise the longitudinal edge portions of the strips before the latter are introduced into said passage.

14. In a machine for forming wads, the combination with mechanism to enclose an axially moving core in a continuous tubular wrapper, of a forming passage disposed in advance of said mechanism and arranged to form wad material to a cross-section approximating to that of the final wad and the walls of said passage being movable at the same speed and in the same direction as the wad material, a conveyor to move strips of wad material lengthwise through the forming passage and towards said mechanism, and means to engage and raise the longitudinal edge portions of the strips before the latter are introduced into said passage.

15. In a machine for forming wads, the combination with mechanism to enclose an axially moving core in a continuous tubular wrapper, of a conveyor to move strips of wad material lengthwise in succession towards said mechanism, and shaping elements cooperating with said conveyor to form the wad material to a cross-section approximating to that of the final wad, said shaping elements comprising means disposed above the conveyor to engage the strips between the longitudinal edges thereof, means to engage and raise the longitudinal edge portions of the strips, and a pair of opposed surfaces movable at the same speed and in the same direction as the wad material to compress the folded material.

16. In a machine for forming wads, mechanism to enclose an axially moving core in a continuous tubular wrapper, a conveyor to move wad material towards said mechanism, and stationary shaping elements cooperating with said conveyor to form the wad material to a cross-section approximating to that of the final wad prior to the wad material being delivered to the wrapping material.

17. In a machine for forming wads, means for providing and forwarding a continuous wrapper, a conveyor for delivering wad material to said wrapper, stationary shaping elements cooperating with said conveyor to form the wad material into a cross-sectional configuration approximating that of the final wad prior to the wad material being delivered to the wrapping material, and means for forming said wrapper into a continuous tubular configuration and enclosing the axially moving wad material therein as a core.

18. In a machine for forming wads, the combination with mechanism to enclose an axially moving core in a continuous tubular wrapper, of a forming passage disposed in advance of said mechanism and arranged to form wad material to a cross-section approximating to that of the final wad and the walls of said passage being movable at the same speed and in the same direction as the wad material, a conveyor to move strips of wad material lengthwise through the forming passage and towards said mechanism, means to engage and raise the longitudinal edge portions of the strips before the latter are introduced into said passage, and a partition disposed between the raised portions and cooperating with said last named means to direct the raised portions towards that portion of the material which is engaged by the conveyor.

FÉLIX FRÉDÉRIC RUAU.